(12) United States Patent
Kobler et al.

(10) Patent No.: US 10,882,512 B2
(45) Date of Patent: Jan. 5, 2021

(54) DRIVE SYSTEM FOR A HYBRID VEHICLE AND METHOD FOR OPERATING SAID SYSTEM

(71) Applicant: Bayerische Motoren Werke Aktiengesellschaft, Munich (DE)

(72) Inventors: Sebastian Kobler, Munich (DE); Thomas Jung, Munich (DE); Bernhard Hoess, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 16/109,981

(22) Filed: Aug. 23, 2018

(65) Prior Publication Data

US 2018/0362020 A1 Dec. 20, 2018

Related U.S. Application Data

(63) Continuation of application No. PCT/EP2017/053824, filed on Feb. 21, 2017.

(30) Foreign Application Priority Data

Feb. 24, 2016 (DE) ........................ 10 2016 202 828

(51) Int. Cl.
  *B60W 20/40* (2016.01)
  *B60K 6/30* (2007.10)
  (Continued)

(52) U.S. Cl.
  CPC .............. *B60W 20/40* (2013.01); *B60K 6/26* (2013.01); *B60K 6/28* (2013.01); *B60K 6/30* (2013.01);
  (Continued)

(58) Field of Classification Search
  CPC ...... B60W 20/40; B60W 10/02; B60W 10/06; B60W 10/08; B60W 2710/025;
  (Continued)

(56) References Cited

U.S. PATENT DOCUMENTS 4,411,171 A 10/1983 Fiala
4,533,011 A 8/1985 Heidemeyer et al.
(Continued)

FOREIGN PATENT DOCUMENTS

CN 1355747 A 6/2002
CN 101258044 A 9/2008
(Continued)

OTHER PUBLICATIONS

International Search Report (PCT/ISA/210) issued in PCT Application No. PCT/EP2017/053824 dated May 12, 2017 with English translation (six (6) pages).
(Continued)

*Primary Examiner* — Maceeh Anwari
(74) *Attorney, Agent, or Firm* — Crowell & Moring LLP

(57) ABSTRACT

A drive system for a hybrid vehicle and a method of operation of the drive system are provided. The drive system includes an internal combustion engine having a shaft, a vehicle transmission having a transmission input shaft and an output shaft, a transmission clutch between the transmission input and output shafts, an inertia-mass drive unit arranged between the internal combustion engine shaft and the transmission input shaft, a first clutch between the internal combustion engine shaft and inertia-mass drive unit and a second clutch between the inertia-mass drive unit and the transmission input shaft; and an electrical machine torque-transmittingly connected to the transmission input shaft. The inertia-mass drive unit may include rotational oscillation reduction device. Operation of the first, second
(Continued)

and transmission clutches in coordination with electric motor and engine operation provides multiple operating modes while minimizing operator disturbance during transitions between engine deactivated and activated states.

18 Claims, 5 Drawing Sheets

(51) Int. Cl.
- *B60K 6/387* (2007.10)
- *B60W 10/02* (2006.01)
- *B60W 10/06* (2006.01)
- *B60W 10/08* (2006.01)
- *B60K 6/547* (2007.10)
- *B60K 6/26* (2007.10)
- *B60K 6/28* (2007.10)
- *B60K 6/36* (2007.10)
- *B60K 6/40* (2007.10)
- *B60K 6/48* (2007.10)
- *F16F 15/14* (2006.01)

(52) U.S. Cl.
CPC ............... *B60K 6/36* (2013.01); *B60K 6/387* (2013.01); *B60K 6/40* (2013.01); *B60K 6/48* (2013.01); *B60K 6/547* (2013.01); *B60W 10/02* (2013.01); *B60W 10/06* (2013.01); *B60W 10/08* (2013.01); *F16F 15/145* (2013.01); *B60K 2006/268* (2013.01); *B60K 2006/4825* (2013.01); *B60W 2510/0208* (2013.01); *B60W 2510/06* (2013.01); *B60W 2510/0638* (2013.01); *B60W 2520/10* (2013.01); *B60W 2710/021* (2013.01); *B60W 2710/025* (2013.01); *B60W 2710/06* (2013.01); *B60W 2710/08* (2013.01); *B60W 2710/1011* (2013.01); *B60Y 2200/92* (2013.01); *F16F 2230/18* (2013.01); *Y02T 10/62* (2013.01)

(58) Field of Classification Search
CPC . B60W 2710/1011; B60W 2510/0208; B60W 2510/06; B60W 2510/0638; B60W 2520/10; B60W 2710/021; B60W 2710/06; B60W 2710/08; B60K 6/547; B60K 6/26; B60K 6/28; B60K 6/36; B60K 6/40; B60K 6/48; B60K 6/30; B60K 6/387; B60K 2006/268; B60K 2006/4825; B60K 6/24; F16F 15/145; F16F 2230/18; Y02T 10/6252; Y02T 10/6286; B60Y 2200/92

USPC .......................................................... 701/22
See application file for complete search history.

(56) References Cited

U.S. PATENT DOCUMENTS

| | | |
|---|---|---|
| 6,705,416 B1 | 3/2004 | Glonner et al. |
| 2002/0177504 A1 | 11/2002 | Pels et al. |
| 2006/0249319 A1 | 11/2006 | Hoare et al. |
| 2008/0011529 A1 | 1/2008 | Hoher et al. |
| 2009/0020354 A1 | 1/2009 | Roth |
| 2009/0037060 A1 | 2/2009 | Carlhammar et al. |
| 2011/0114396 A1 | 5/2011 | Schramm et al. |
| 2015/0038290 A1 | 2/2015 | Bichler et al. |
| 2016/0046281 A1 | 2/2016 | Nedorezov et al. |
| 2017/0050506 A1 | 2/2017 | Trinkenschuh et al. |

FOREIGN PATENT DOCUMENTS

| | | | |
|---|---|---|---|
| CN | 102632800 A | | 8/2012 |
| CN | 103826894 A | | 5/2014 |
| CN | 104786819 A | | 7/2015 |
| DE | 29 43 554 A1 | | 5/1981 |
| DE | 30 22 373 A1 | | 12/1981 |
| DE | 195 49 259 A1 | | 3/1997 |
| DE | 10 2004 023 673 A1 | | 12/2005 |
| DE | 10 2007 033 575 A1 | | 3/2009 |
| DE | 10 2007 050 235 A1 | | 4/2009 |
| DE | 102007050235 | * | 4/2009 |
| DE | 10 2009 024 530 A1 | | 12/2010 |
| DE | 10 2015 113 125 A1 | | 2/2016 |
| GB | 2 413 998 A | | 11/2005 |
| JP | 2002-362197 A | | 12/2002 |
| JP | 2006-315673 A | | 11/2006 |
| WO | WO 2015/172784 A2 | | 11/2015 |

OTHER PUBLICATIONS

German-language Written Opinion (PCT/ISA/237) issued in PCT Application No. PCT/EP2017/053824 dated May 12, 2017 (six (6) pages).

German-language Search Report issued in counterpart German Application No. 10 2016 202 828.6 dated Oct. 28, 2016 with partial English translation (eleven (11) pages).

Chinese-language Office Action issued in Chinese Application No. 201780010780.X dated Sep. 1, 2020 with English translation (15 pages).

Japanese-language Office Action issued in Japanese Application No. 2018-544242 dated Oct. 19, 2020 with English translation (four (4) pages).

* cited by examiner

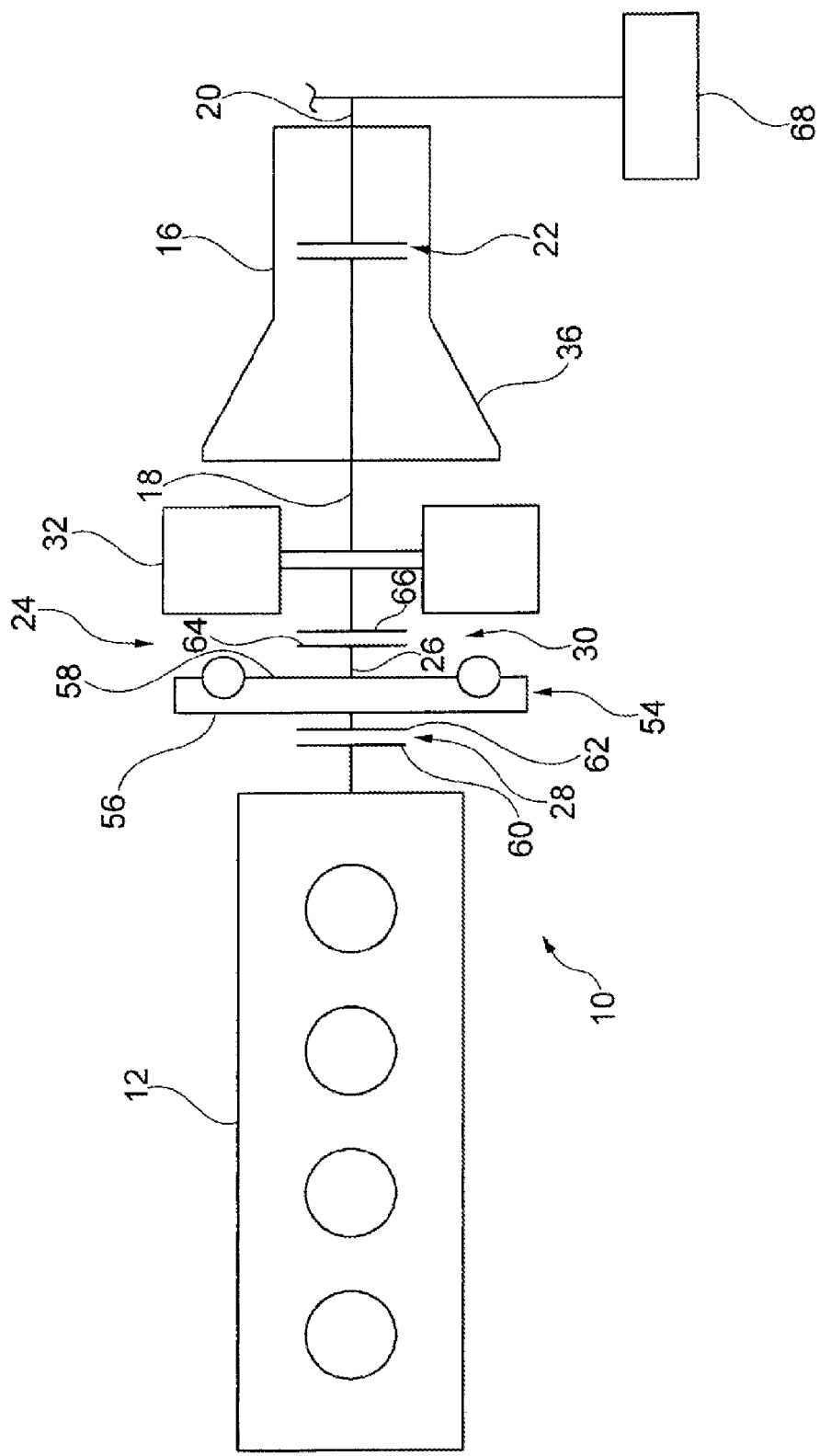

DRIVE SYSTEM FOR A HYBRID VEHICLE AND METHOD FOR OPERATING SAID SYSTEM

CROSS REFERENCE TO RELATED APPLICATIONS

This application is a continuation of PCT International Application No. PCT/EP2017/053824, filed Feb. 21, 2017, which claims priority under 35 U.S.C. § 119 from German Patent Application No. 10 2016 202 828.6, filed Feb. 24, 2016, the entire disclosures of which are herein expressly incorporated by reference.

BACKGROUND AND SUMMARY OF THE INVENTION

The invention relates to a drive system for a hybrid vehicle, and to a method for operating a drive system of said type.

To operate hybrid vehicles in an energy-efficient manner, drive systems are already known from the prior art which, when an accelerator pedal is not operated, that is to say when no active vehicle acceleration is demanded by the driver of the hybrid vehicle, eliminate the force-transmitting connection (torque-conducting connection between the drive motor and the driveable wheels) in the drivetrain with the internal combustion engine (drive engine) in fired operation, in order to achieve an operating state of so-called "idle coasting". It is furthermore already known for the internal combustion engine to be deactivated when an accelerator pedal, by means of which an acceleration demand for the hybrid vehicle can be predefined by the driver, is not operated and a force-transmitting connection is present in the drivetrain, such that mechanical cranking of the internal combustion engine with optional braking recuperation is realized.

DE 29 43 554 A1 discloses a hybrid drive for a vehicle, having an internal combustion engine as first drive source, an electric machine as further drive source, a vehicle transmission for providing different transmission ratio stages (gear ratios), and two separating clutches, wherein, during travel, the internal combustion engine is periodically decoupled and recoupled by means of the opening and closing of the separating clutches, and can additionally be shut down, in suitable operating phases, wherein the internal combustion engine is formed without a flywheel. The required centrifugal mass is assigned to the electric machine, and said centrifugal mass is in particular integrated at least partially into the rotating part of the electric machine. By virtue of the internal combustion engine being formed without a flywheel, said internal combustion engine comes to a stop virtually without a delay when the separating clutch between the internal combustion engine and the electric machine is disengaged, and said internal combustion engine can, owing to its low mass, be started up again in substantially jerk-free fashion by recoupling to the rotating electric machine.

Proceeding from the known prior art, for traction operation of the hybrid vehicle with a shut-down internal combustion engine, it has been found that, in the event of an acceleration demand from the driver that requires the starting of the internal combustion engine, a certain length of time passes before the internal combustion engine has started and the vehicle actually accelerates. Such behavior of the drive system can have an adverse effect on driving comfort and may therefore be perceived by the driver as disturbing.

Furthermore, tests have shown that, in the event of the re-coupling of the internal combustion engine to the electric machine, which is connected to the output, that is to say to the driveable wheels of the hybrid vehicle, compression shocks of the internal combustion engine during the start-up of the internal combustion engine can be transmitted to the rest of the drivetrain, and thus drivetrain vibrations can occur; this can likewise be perceived by the driver as disturbing.

It is an object of the invention to provide a drive system for a hybrid vehicle, and a method for the operation of said drive system, which permits a particularly rapid vehicle reaction to an acceleration demand from the driver even in the case of an initially shut-down internal combustion engine.

The drive system is provided for a hybrid vehicle and preferably has an internal combustion engine which has and can drive an internal combustion engine shaft, a shiftable vehicle transmission which, at the drive side, has a transmission input shaft arranged preferably coaxially with respect to the internal combustion engine shaft and, at the output side, has a transmission output shaft arranged preferably coaxially with respect to the internal combustion engine shaft. It is furthermore preferable for the drive system to have a transmission clutch for the coupling or decoupling of the transmission input shaft and the transmission output shaft to or from one another.

The transmission clutch is preferably designed as a clutch which is capable of slippage and which is controllable in terms of slippage. A clutch which is capable of slippage is to be understood in particular to mean a clutch by means of which, at least in selected operating phases, slippage between the elements for coupling by means of said clutch is made possible, and said slippage is preferably controllable. Here, in the context of the invention, the coupling or decoupling is to be understood to mean the production or elimination of a torque-conducting connection by means of the clutch. The prior art has disclosed various structural forms of such clutches, in particular frictionally locking clutches, hydrodynamic clutches or frictionally/positively locking clutches. In this context, a frictionally/positively locking clutch is to be understood to mean a clutch in which, during the closure of the clutch, a frictionally locking connection is initially produced and, when the clutch is fully closed, a positively locking connection exists for the transmission of the torque; such a principle is known for example from conical synchronizing devices in automotive engineering.

In particular, for starting the internal combustion engine, the drive system has a centrifugal mass drive unit which is arranged in an axial direction between the internal combustion engine and the vehicle transmission, and it is furthermore preferable for the centrifugal mass drive unit to have an intermediate shaft arranged preferably coaxially with respect to the internal combustion engine shaft.

The centrifugal mass drive unit has a rotary vibration reduction device with a drive-side DU input shaft and an output-side DU output shaft, wherein the rotary vibration reduction device is designed for reducing rotary vibrations in particular of the intermediate shaft. The rotary vibration reduction device is, with regard to the transmission of the drive power from the internal combustion engine to the driveable wheels, arranged preferably entirely between the first clutch and the second clutch.

Thus, the rotary vibration reduction device can be utilized as an effective centrifugal mass of the centrifugal mass drive unit and thus of the drive system as a whole. Centrifugal mass drive units known from the prior art commonly have high moments of inertia owing to their operating principle. For the stated reasons, the preferably complete arrangement of the rotary vibration reduction device between the first clutch and the second clutch is advantageous because, in this way, it is preferably the case that virtually no further additional centrifugal mass, or preferably no further additional centrifugal mass whatsoever, or particularly preferably only a small further additional centrifugal mass, is installed as a so-called effective centrifugal mass of the centrifugal mass drive unit. In particular, a further additional centrifugal mass in the drivetrain would impair the dynamics of said drivetrain, because said additional centrifugal mass would have to be jointly accelerated in particular during acceleration phases of the hybrid vehicle, and furthermore, an additional centrifugal mass of said type can in particular also lead to relatively low efficiency of the drive system. In particular by means of the proposed complete arrangement of the rotary vibration reduction device between the first clutch and the second clutch, a drive system can be realized which exhibits improved dynamic behavior.

The rotary vibration reduction device preferably comprises a primary side facing toward the internal combustion engine and a secondary side facing toward the transmission.

In a preferred embodiment, the rotary vibration reduction device is designed as a rotational-speed-adaptive (rotary) vibration absorber and, for the provision of a rotational-speed-dependent absorption characteristic (rotational speed adaptation), preferably has, or is preferably composed of, a centrifugal pendulum.

In a further preferred embodiment, the rotary vibration reduction device is formed as a semiactive or active absorber/vibration absorber. In particular, such a device is to be understood to mean a rotary vibration reduction device which has an active or semiactive element by means of which a transmission characteristic of said rotary vibration reduction device can be influenced or controlled, and wherein said active or semiactive element is preferably actuatable by means of an external control command. Such semiactive or active absorbers are known from the prior art. A semiactive or active absorber preferably has an electric, preferably a pneumatic and particular preferably a hydraulic device by means of which the transmission characteristic of said rotary vibration reduction device can be influenced in active or semiactive fashion.

With regard to the classification active/passive, at least three types of vibration absorbers are known from the prior art and may be used in principle as a rotary vibration reduction device for the proposed drive system:
  (conventional) passive absorbers, in particular a dual-mass flywheel,
  actively controlled absorbers, in particular hydraulic systems in which the required energy for the vibration absorption is supplied from an external source,
  semiactive absorbers, in the case of which the energy required in the case of need is stored in particular in an elastic element (blocking and release only above a particular threshold value).

The drive system has in particular a first clutch for the coupling or decoupling of the internal combustion engine shaft and the intermediate shaft, a second clutch for the coupling or decoupling of the intermediate shaft and the transmission input shaft, and an electric machine, which is preferably seated on the transmission input shaft or preferably coupled or selectively couplable thereto in rotationally rigid fashion, in particular for power transmission. In particular in the case of such an arrangement, the transmission input shaft can be driven by the electric machine, in a motor operating mode of the electric machine, directly and thus in a particularly energy-efficient manner. An input side of the first clutch (drive-side part of said clutch) is connected preferably directly, preferably rotationally conjointly or rotationally rigidly, to the internal combustion engine shaft.

In particular, this construction of the drive system permits, even in the case of a shut-down internal combustion engine, a very rapid vehicle reaction in the case of a vehicle acceleration being demanded by the driver (predefinable by means of the accelerator pedal position), for which the internal combustion engine is transferred from the non-fired operating mode into the fired operating mode and is used for driving the hybrid vehicle. Even in the case of an operation of the accelerator pedal for active acceleration of the vehicle, the electric machine can immediately switch into the motor operating mode and couple to the automatic transmission, and it is thus in particular made possible, without the internal combustion engine, for the vehicle to be accelerated within the scope of the performance capability of the electric machine (zero-omission operation). At the same time, a mechanical start (impulse start) of the shut-down internal combustion engine can be realized by means of the centrifugal mass drive unit. In the context of the invention, the impulse start of the internal combustion engine is to be understood to mean that the internal combustion engine shaft is connected to the centrifugal mass drive unit, in particular in rotationally rigid or preferably rotationally conjoint fashion, for power transmission, and thus power (rotational speed, torque) is transmitted from the rotating centrifugal mass drive unit to the internal combustion engine shaft, such that the internal combustion engine shaft is accelerated to a starting rotational speed above which the internal combustion engine can be set in fired operation (internal combustion engine starting rotational speed).

The first clutch is preferably designed for the start-up of the internal combustion engine by means of the centrifugal mass drive unit, or said first clutch is closed for the start-up of the internal combustion engine. Preferably, the first clutch is designed such that it is switched, preferably only, between the states open/closed. The first clutch is preferably formed as a frictionally locking clutch, preferably as a positively locking clutch and particular preferably as a frictionally/positively locking clutch. It is furthermore preferable for the first clutch to be formed as a so-called "normally open" clutch (no torque can be transmitted in the non-operated state of the clutch), and preferably as a so-called "normally closed" clutch (a torque can be transmitted by the clutch in the non-operated state thereof). By means of a "normally closed" clutch in particular, a particularly efficient drive system can be realized because no losses arise in this clutch in maintaining the torque-conducting connection.

The second clutch is preferably designed for transmitting drive power from the centrifugal mass drive unit to the transmission input shaft. The second clutch is preferably formed as a clutch which is in particular controllable in closed-loop fashion in terms of slippage, in particular in order to permit improved driving comfort. In particular, a clutch which is controllable in terms of slippage permits closed-loop control of the slippage during the engagement (transferred from the open state into the closed state) of the clutch. The second clutch is preferably formed as a launch clutch, which is preferably formed as a single-disk or multi-disk friction clutch or preferably as a hydrodynamic torque converter with or without a lockup clutch. The second clutch is preferably formed as a frictionally locking clutch, preferably as a frictionally/positively locking clutch. It is furthermore preferable for the second clutch to be formed as a so-called "normally open" clutch, and preferably as a so-called "normally closed" clutch. By means of a "normally closed" clutch in particular, a particularly efficient drive system can be realized because no losses arise in this clutch in maintaining the torque-conducting connection.

In the proposed method for controlling the drive system, the time period until the internal combustion engine has started up and can be used for accelerating the hybrid vehicle is bridged by the electric machine, such that, in such a phase, electric vehicle acceleration is realized. The drive system thus acts less inertly—because a vehicle acceleration is not performed for the first time after the starting of the internal combustion engine—and provides the driver with a rapid vehicle reaction, which is perceived as pleasant.

In a preferred embodiment, the centrifugal mass drive unit has a rotary vibration reduction device with a drive-side DU input shaft and an output-side DU output shaft. In the context of the invention, a rotary vibration reduction device is to be understood to mean a device for reducing rotary vibrations that can be imparted in particular by the internal combustion engine to the internal combustion engine shaft and thus to the drive system itself. The rotary vibration reduction device is preferably formed as a rotary vibration damper or rotary vibration absorber or as a combination of these two devices. Such rotary vibration reduction devices are known in a wide variety of structural forms from the prior art. The rotary vibration reduction device is preferably selected from a group of devices which comprises the following devices:

single-mass, dual-mass or multi-mass flywheel,
rotary vibration absorber, preferably rotational-speed-adaptive absorber, more preferably rotary vibration absorber with centrifugal pendulum,
active rotary vibration absorber/damper, preferably with controllable hydraulic or electric elements for rotary vibration reduction,
semiactive rotary vibration absorber/damper
or a combination of at least two of the above-stated devices.

In particular, the rotary vibration reduction device is arranged such that rotary vibrations of the intermediate shaft can be reduced by means thereof. Preferably, at least the DU input shaft or the DU output shaft is connected rotationally conjointly, preferably rotationally rigidly, to the intermediate shaft. It is furthermore preferable for at least one of said shafts (DU input shaft/DU output shaft) to be formed as said intermediate shaft. The rotary vibration reduction device is preferably, with regard to the transmission of the drive power from the internal combustion engine to the driveable wheels of the hybrid vehicle, arranged entirely between the first clutch and the second clutch. In particular, by means of this arrangement, the entire rotating mass of the rotary vibration reduction device is concentrated on the intermediate shaft, and thus particularly good starting of the internal combustion engine is made possible because the inertia of the internal combustion engine is reduced in relation to conventional systems, and the inertia of the centrifugal mass drive unit is increased.

In systems known from the prior art, it is commonly the case that at least a part of or the entire rotary vibration reduction device, for example a primary side of a dual-mass flywheel, is permanently coupled to the internal combustion engine shaft. Such a conventional arrangement thus has the effect that said rotary masses part of the rotary vibration reduction device (primary side of the dual-mass flywheel) must be accelerated from a standstill during the starting of the internal combustion engine, and thus lengthens the starting process (greater inertia). Furthermore, in the case of known systems, the kinetic energy that can be stored in the originally provided centrifugal mass (for example secondary side of the dual-mass flywheel) and which is used for starting the internal combustion engine, is relatively low, because the part (primary side of the dual-mass flywheel) coupled to the internal combustion engine does not co-rotate with said centrifugal mass. In order, in the case of conventional systems, to achieve a rotary mass, sufficient for starting the internal combustion engine, of the centrifugal mass that is used for starting the internal combustion engine, the centrifugal mass is enlarged by additional weights, and an enlargement of the centrifugal mass leads overall to a more inert drive system.

In a preferred embodiment of the drive system, the rotary vibration reduction device is designed such that the DU input shaft is rotatable relative to the DU output shaft for the purposes of the reduction of the rotary vibrations. It is furthermore preferable for the DU input shaft and the DU output shaft to be arranged concentrically with respect to one another. Preferably, at least one of said shafts (DU input shaft/DU output shaft) is arranged concentrically with respect to the internal combustion engine shaft, or preferably, both are arranged concentrically with respect thereto. By means of such an embodiment in particular, a particularly simple construction of the drive system is made possible.

In a preferred embodiment, an output side of the first clutch is permanently rotationally conjointly connected to the intermediate shaft or the preferably to the DU input shaft. It is furthermore preferable for an input side of the second clutch to be permanently rotationally conjointly connected to the intermediate shaft or preferably to the DU output shaft. Preferably, the centrifugal mass drive unit has the output side of the first clutch, the rotary vibration reduction device, the intermediate shaft, the input side of the second clutch and a centrifugal mass, and the centrifugal mass drive element is preferably composed of said elements. The centrifugal mass drive unit is preferably composed of the output side of the first clutch, of the rotary vibration reduction device, of the intermediate shaft and of the input side of the second clutch. By means of such an arrangement in particular, a space-saving construction can be realized. In particular, by means of a complete integration of the rotary vibration reduction device into the centrifugal mass drive unit, the major part of the energy required for the starting of the internal combustion engine by means of the centrifugal mass drive unit can already be realized by means of the rotary mass of the rotary vibration reduction device, and therefore no additional centrifugal mass, or only a small additional centrifugal mass, has to be provided.

In one embodiment of the drive system, the electric machine is a low-voltage electric machine with an operating voltage, in particular a rated operating voltage, of less than 60 V, and preferably the electric machine is briefly operable at higher voltage levels, so-called peak power/peak voltage. Owing to the design as a low-voltage electric machine, it is possible for a low-voltage drive system to be realized, which is technically relatively easy to manage, in particular in relation to a high-voltage drive with voltage levels of in some cases several hundred volts. This lies in particular in the fact that, owing to the relatively low electrical voltage in the system, the hazard risk is lower, and the fuse protection of the on-board electrical system can thus be provided more easily and at lower cost.

The electric machine used is preferably a 48 V electric machine, because this can provide a higher power in relation to a conventional 12 V electric machine both in the generator operating mode during recuperation and in the motor operating mode. In particular during the use of the electric machine for accelerating the hybrid vehicle, a higher power (which can be realized by means of a 48 volt electric machine in relation to a 12 volt electric machine) has a noticeable positive effect, because the faster vehicle reaction that can thereby be achieved is perceptible to the driver.

The electric machine is preferably integrated, preferably at least partially or preferably entirely, into the vehicle transmission, which is preferably designed as an automatic transmission, preferably as a manually shiftable vehicle transmission or particularly preferably as a vehicle transmission with automated shift capability. The electric machine preferably has a stator and a rotor that is rotatable relative to said stator. The stator is preferably connected rotationally conjointly to a transmission housing of the vehicle transmission.

The vehicle transmission preferably has, at the drive side, a clutch bell housing, wherein the electric machine, or at least the stator thereof, is accommodated in the clutch bell housing. Here, the electric machine preferably replaces or supplements the torque converter that is conventionally provided in the clutch bell housing in the case of automatic transmissions of planetary transmission construction, such that an electric machine of compact design can be integrated into the vehicle transmission without additional structural space requirement. This leads to a particularly compact construction of the drive system.

In a further embodiment of the drive system, an on-board electrical system is provided, wherein the electric machine is also operable as a generator, and, preferably, the electric machine is formed as an electromechanical energy converter which is preferably operable at least as a generator and as a motor, and said electric machine is particularly preferably operable in the so-called multi-quadrant operating mode, and very particularly preferably in the four-quadrant operating mode. In the generator operating mode in particular, electrical power can be stored in the on-board electrical system by the electric machine. In this way, the electric machine can be utilized for recuperation, in the case of which kinetic energy of the hybrid vehicle is converted into electrical energy that can preferably be stored in an electrochemical energy store, preferably a storage battery.

The object mentioned in the introduction is also achieved by means of a method as claimed in patent claim 12. Said method is provided for operating the above-described drive system and can be stored in the form of computer-executable commands on a control unit, and, preferably, a control unit for a motor vehicle is provided on which said method is stored in the form of computer-executable commands. Said method furthermore has the following steps:

a) in an operating state of the drive system, the first clutch is opened or kept in an open state and the internal combustion engine is deactivated, or said internal combustion engine is already in a deactivated state;

c) by means of the closed second clutch, the centrifugal mass drive unit is at least accelerated to a centrifugal mass starting rotational speed, or is kept at said centrifugal mass starting rotational speed or at a higher rotational speed, by means of the electric machine, d) a signal for active vehicle acceleration is transmitted to the electric control unit, whereby a start-up of the internal combustion engine becomes necessary;

e) the second clutch is thereupon opened by the electric control unit;

f) subsequently, or in a simultaneously overlapping manner with the second clutch, the first clutch is closed such that, by means of the angular momentum equalization between centrifugal mass drive unit and internal combustion engine shaft, the internal combustion engine is accelerated to an internal combustion engine starting rotational speed;

g) proceeding from the internal combustion engine starting rotational speed, the internal combustion engine is operated in a fired operating mode and is accelerated to an internal combustion engine target rotational speed.

In particular after the internal combustion engine target rotational speed has been reached, the internal combustion engine can be used for vehicle acceleration. Preferably, in a further preferred method step, after the internal combustion engine starting rotational speed has been reached, in particular after the internal combustion engine target rotational speed has been reached, the second clutch is closed. It is furthermore preferably the case that the transmission clutch is also at least partially or preferably completely in a closed state or is at least partially or preferably completely closed, such that a force-transmitting connection is produced between the internal combustion engine and the driveable wheels of the hybrid vehicle and thus power (rotational speed/torque) can be transmitted from the internal combustion engine to the driveable wheels or vice versa.

In the context of the invention, the internal combustion engine target rotational speed is to be understood to mean a rotational speed of the internal combustion engine shaft which results from the driving conditions of the hybrid vehicle, in particular from the rotational speed which results from the traveling speed of the hybrid vehicle and the engaged gear ratio (transmission ratio) in the vehicle transmission. In particular, the internal combustion engine target rotational speed is a rotational speed of the internal combustion engine shaft predefined by the control unit.

It is particularly preferably additionally the case that a method step b) is performed, and said method step b) is preferably performed between two of the directly successive steps above, and method step b) is preferably performed between the method steps a) and c). In the method step b), the electric machine is operated with the transmission clutch closed, preferably with the transmission clutch completely closed or preferably with the transmission clutch partially closed, wherein the transmission clutch is operated in the partially closed state with slippage. The transmission clutch in this case has a force-transmitting connection for power transmission from the transmission input shaft via further drivetrain elements to the driveable wheels of the hybrid vehicle. In particular, by means of this control of the transmission clutch with force-transmitting connection to the driveable wheels, it is made possible for a positive or negative torque to be imparted to the driveable wheels of the hybrid vehicle. In particular, by means of this control of the drive system, it is possible for the hybrid vehicle to be driven purely electrically, that is to say in particular driven with the internal combustion engine decoupled. In the presence of relatively high load demands, such as may arise in particular during acceleration of the hybrid vehicle and which can no longer be covered by the electric machine alone, the internal combustion engine is, by means of the method steps c) and the following (et seq.), preferably c) to e), started up in particular in a rapid and comfortable manner and coupled into the drive system. By means of the proposed method, a start-up of the internal combustion engine which is in particular imperceptible to the driver is thus made possible.

It is preferable if, with the internal combustion engine deactivated and with the vehicle in a standstill state or traveling at crawling speed, that is to say during operation of the hybrid vehicle at low speed, in particular at speeds of less than 50 km/h, preferably less than 25 km/h and preferably less than 10 km/h and particularly preferably less than 5 km/h, the transmission clutch is, before step b), placed into slipping operation (transmission clutch partially closed) such that the electric machine has a force-transmitting connection (torque transmission) to the driveable wheels of the hybrid vehicle in order to thereby preferably provide a positive or negative torque at the driveable wheels of the hybrid vehicle. It is preferably the case that, at the same time, the second clutch is in a closed state or is preferably closed, such that the electric machine and the centrifugal mass drive unit are connected rotationally conjointly to one another. In such a case, the electric machine is preferably operated at or above the centrifugal mass starting rotational speed, wherein the centrifugal mass starting rotational speed is, in particular in such a situation, higher than the rotational speed of the electric machine that results from the wheel rotational speed of the driveable wheels at the present vehicle speed in the case of a completely closed transmission clutch.

The abovementioned process/sequence is in particular similar to the operation of a conventional drivetrain, known from the prior art, of a vehicle with drive provided by internal combustion engine in the low-speed range, in the case of which the rotational speed of the internal combustion engine shaft, which must be equal to or higher than the idle rotational speed of the internal combustion engine, still lies above the rotational speed of the transmission input shaft which results from the wheel rotational speed of the driveable wheels, and which correlates with the traveling speed of the vehicle.

In particular, the described method yields the advantage that the centrifugal mass drive unit can, even in this low-speed range (creep speed), be conditioned in terms of rotational speed such that a start-up process of the internal combustion engine can be performed in accordance with the method steps c) to e); the internal combustion engine can be advantageously started by means of the centrifugal mass drive unit when said internal combustion engine is at a rotational speed sufficient for the transfer from non-fired to fired operation, the so-called internal combustion engine starting rotational speed. The internal combustion engine starting rotational speed is a predefinable variable which is dependent in particular on the type of construction of the internal combustion engine.

The centrifugal mass starting rotational speed preferably lies in a range which is higher than 500 revolutions per minute (rpm), preferably higher than 750 rpm, preferably higher than or equal to 1000 rpm, and furthermore said range is lower than 2000 rpm, preferably lower than 1600 rpm, and said range is preferably lower than or equal to 1400 rpm.

The centrifugal mass starting rotational speed is preferably set already after an initialization of the vehicle, in particular after an identification of an impending starting process, by means of the electric machine in the standstill state of the vehicle.

Preferably, in the case of launching of the hybrid vehicle from the standstill state of the vehicle, it may be advantageous, in particular from an energy aspect, for the centrifugal mass starting rotational speed to be set by means of the electric machine at the same time as the provision of a positive drive torque of the electric machine for driving the hybrid vehicle, preferably upon the first provision of a positive drive torque of the electric machine to the driveable wheels of the hybrid vehicle.

In particular, by means of this method, in the case of a desired, active vehicle acceleration with the internal combustion engine shut down, that is to say in a non-fired and decoupled state, a rapid reaction of the drivetrain to this acceleration demand is made possible. Firstly, the acceleration demand is addressed directly by the electric machine (positive drive torque is provided), and at the same time, the internal combustion engine is started (by means of the centrifugal mass drive unit), such that after a short time, the internal combustion engine can additionally be used for accelerating the hybrid vehicle.

It is possible in particular for at least five operating modes for the drive system to be specified, which can preferably be implemented in addition to or preferably as an alternative to the operating method discussed above, and, in particular, said operating modes can be implemented in combination with the operating method mentioned above. These five operating modes are:

Mode1: Initial start of the internal combustion engine
Mode2: Operation in the low-speed range in electric creep operation
Mode3: Shutdown of the internal combustion engine
Mode4: Start or re-start of the internal combustion engine (shut-down state of the internal combustion engine) in the standstill state of the vehicle or during travel
Mode5: Traction operation with shut-internal combustion engine, that is to say engine-off coasting, engine-off recuperation, engine-off electric driving with torque provision by the electric machine These operating modes will be discussed in more detail below.

Mode1, Initial Start

This operating state is distinguished in particular by the fact that the internal combustion engine is shut down (no fired operation, internal combustion engine shaft stationary) and initially no kinetic energy is stored in the centrifugal mass drive unit, that is to say the intermediate shaft is stationary.

In Mode1, the drive system is controllable by means of a method which has the steps:
 opening transmission clutch or keeping transmission clutch in an open state,
 closing second clutch or keeping second clutch in a closed state,
 opening first clutch or keeping first clutch in an open state,
 by means of the electric machine, accelerating the rotary vibration reduction device to the rotational speed required for the starting of the internal combustion engine (centrifugal mass starting rotational speed),
 closing the first clutch after the centrifugal mass starting rotational speed is reached,
 setting the internal combustion engine in fired operation.

During this starting process, the internal combustion engine is started in particular by means of a summed starting torque, which originates from the rotating centrifugal mass drive unit and preferably the torque of the electric machine. This so-called initial start of the internal combustion engine is preferably initiated by the actuation of a starting switch or preferably an ignition lock.

With such a starting method according to Mode1, it is also possible to realize advantageous cold starting of the internal combustion engine with a high breakaway torque without an additional starting device (for example pinion-type starter).

In a preferred embodiment of the invention, the actuation of a starting device, in particular of a so-called ignition lock or of a starting switch, is preceded by the acceleration of the centrifugal mass drive unit and thus of the rotary vibration reduction device fully or partially to the centrifugal mass starting rotational speed. In particular by means of this chronological advancement (prediction of the starting process) of the acceleration of the centrifugal mass drive unit in relation to the actual starting process of the internal combustion engine, the initial start of the internal combustion engine can take place particularly quickly. The acceleration of the centrifugal mass drive unit is preferably initiated by means of a proximity detection, a so-called radio key or preferably a detection of the opening of a door of the vehicle or particular preferably by means of a seat occupancy detection. Descriptively speaking, the vehicle is placed into a state of readiness to start (acceleration of the centrifugal mass drive unit by means of the electric machine) as soon as a vehicle driver has sat down on a driver's seat in the hybrid vehicle or when a door, in particular the driver's door, of the hybrid vehicle is opened.

Mode2, Operation in the Low-Speed Range (Electric Creep Operation)

This operating mode is distinguished in particular by the fact that the internal combustion engine is shut down and the hybrid vehicle is moved at a speed in a low-speed range, with drive power being provided by the electric machine. In the context of the invention, a low-speed range is to be understood to mean a speed range in which the speed is lower than 75 km/h, preferably lower than 50 km/h and particularly preferably lower than 15 km/h.

In Mode2, the drive system is controllable by means of a method which has the steps:
  opening first clutch or keeping first clutch in an open state,
  closing second clutch or keeping second clutch in a closed state, such that the centrifugal mass drive unit and the electric machine are connected rotationally conjointly to one another,
  for launching from the standstill state of the hybrid vehicle, the electric machine provides a drive power via the closed second clutch to the transmission input shaft.

In a preferred embodiment of Mode2, the method has the steps:
  partially opening the transmission clutch such that slippage between the transmission input shaft and the transmission output shaft is made possible,
  increasing the rotational speed of the electric machine and thus the rotational speed of the centrifugal mass drive unit to the centrifugal mass starting rotational speed during a transition phase, wherein, in this context, a transition phase is to be understood to mean a time period which is shorter than 5 seconds, preferably shorter than 2 seconds, and the transition phase is preferably at most 1 second or shorter.

In particular, by means of the slippage in the transmission clutch, it is made possible for a rotational speed difference between the rotational speed of the transmission input shaft and the rotational speed of the transmission output shaft, taking into consideration a transmission ratio between the transmission input shaft and transmission output shaft (presently engaged gear ratio of the vehicle transmission), to be depleted in the transmission clutch. This so-called depletion of the rotational speed difference results from the transmission output shaft being coupled by means of a fixed transmission ratio to at least one driveable wheel of the hybrid vehicle and said rotational speed, which is generally proportional to the vehicle speed, being transmitted with the transmission ratio of the engaged gear ratio to the transmission input shaft. With the transmission clutch which is controllable in terms of slippage, it is made possible for the transmission input shaft and thus the centrifugal mass drive unit to be operated virtually independently of the transmission output shaft.

If the start demand for the start-up of the internal combustion engine occurs within the transition phase, in particular owing to an acceleration demand/accelerator pedal position, then it is made possible to perform a so-called combined start involving the centrifugal mass drive unit and the electric machine, in which power is supplied to the internal combustion engine shaft from both of these (electric machine, centrifugal mass drive unit) in order to accelerate said internal combustion engine shaft to the internal combustion engine starting rotational speed. For such a combined start, the transmission clutch is preferably partially or completely opened.

Mode3, Shutdown of the Internal Combustion Engine

This operating mode is distinguished in particular by the fact that the internal combustion engine is stopped proceeding from fired operation, that is to say is shut down.

In Mode3, the drive system is controllable by means of a method which has the steps:
  opening the first clutch, or keeping the first clutch open, and preferably simultaneously shutting down the internal combustion engine, in particular by means of the stoppage of a fuel injection into combustion chambers of the internal combustion engine,
  in particular by virtue of the fact that the rotational speed reduction device is arranged completely between the first and the second clutch and is thus no longer coupled to the internal combustion engine shaft after the opening of the first clutch, the moment of inertia (rotary mass) is reduced in relation to internal combustion engines known from the prior art, and the internal combustion engine shaft comes to a stop already a short time after the shutdown of the internal combustion engine, whereby the comfort of the hybrid vehicle is increased.

Mode4, Start of the Internal Combustion Engine (Proceeding from the Standstill State or from Electric Driving)

This operating mode (Mode4) is distinguished in particular by the fact that the internal combustion engine is in a shut-down state and the hybrid vehicle is being driven by means of the electric machine, or the vehicle is initially in a standstill state.

In Mode4, the drive system is controllable by means of a method which, for this electric traction operation, has the steps:
  the first clutch is opened or is kept in an open state,
  the second clutch is closed or is kept in a closed state, such that the centrifugal mass drive unit and the electric machine are connected rotationally conjointly to one another,
  the transmission clutch is closed or is kept in a closed state, in particular at low speeds of the vehicle, that is to say in particular speeds in the low-speed range, the transmission clutch is operated in a partially closed state with slippage, such that, by means of the electric machine, a torque for the drive of the hybrid vehicle can be provided, and at the same time the centrifugal mass drive unit can be driven,
  in the event of a demand for starting of the internal combustion engine, in particular because the internal combustion engine is driving the electric machine in generator operation for the purposes of providing a supply to the vehicle on-board electrical system or because a demanded acceleration cannot be achieved by means of the electric machine alone, the centrifugal mass drive unit is firstly decoupled from the transmission input shaft by opening of the second clutch, and the electric machine can thus output its full power for drive purposes to the transmission input shaft, it is preferably the case that, at the same time or preferably with a delay in relation to the preceding step, the first clutch is closed such that the internal combustion engine shaft is accelerated by the centrifugal mass drive unit to the internal combustion engine starting rotational speed, and the internal combustion engine is transferred into fired operation.

Preferably, the internal combustion engine accelerates, with the first clutch open, until the rotational speed of the internal combustion engine shaft corresponds to the rotational speed of the centrifugal mass drive unit. In particular, a comfortable switchover to the internal combustion engine during acceleration is made possible by means of this method.

It is furthermore preferable if, after rotational speed equality between the internal combustion engine shaft and the centrifugal mass drive unit and thus the transmission input shaft has been achieved, the second clutch is closed; this takes place in particular while the closed-loop rotational speed control at the internal combustion engine is active.

It is preferably possible, after the closure of the second clutch, for a drive torque to be output by the internal combustion engine from the internal combustion engine shaft to the transmission input shaft, and the hybrid vehicle can thus be accelerated further by means of the internal combustion engine.

Mode5, Engine-Off Recuperation/Coasting/Electric Driving

This operating mode (Mode5) is distinguished in particular by the fact that the internal combustion engine is in a shut-down state, the hybrid vehicle is in motion and the electric machine is being operated in the generator operating mode (recuperation), is co-rotating without electrical energization (coasting), or is being used for driving the hybrid vehicle (electric driving).

In Mode5, the drive system is controllable by means of a method which, for the energy recovery (recuperation), has the steps:

transmission clutch is at least partially or preferably completely closed, or is kept in an at least partially or preferably completely closed state, the first clutch is opened or is kept in an open state, the second clutch is closed or is kept in a closed state, the centrifugal mass drive unit rotates, owing to this coupling (second clutch closed), at the rotational speed of the transmission input shaft, in a driving state of the hybrid vehicle in which neither active acceleration nor active braking are being performed (actuation of neither a vehicle brake nor an accelerator pedal, colloquially gas pedal or closed-loop speed control device), the electric machine is actuated so as to impart to the transmission input shaft a torque that counteracts the present direction of rotation of the transmission input shaft (negative torque), such that, by means of the electric machine, electrical power (voltage, current) can be output, which can be output into a vehicle on-board electrical system.

In particular by means of operation of the hybrid vehicle in the operating mode Mode5, energy recovery is made possible in a particularly simple manner.

Individual relationships of the control of the drive system and of the functioning thereof will be discussed in more detail below.

In an operating state of the drive system, the centrifugal mass drive unit is decoupled from the electric machine (second clutch open) and is coupled to the internal combustion engine (first clutch closed), in order to perform a mechanical impulse start of the internal combustion engine. While the internal combustion engine is being started in this operating state, the electric machine is already coupled to the vehicle transmission, in particular to the transmission output shaft of the vehicle transmission (transmission clutch at least partially or completely closed), and can thus accelerate the hybrid vehicle. The acceleration demand of the driver can thus advantageously be realized by means of the electric machine already before the start-up of the internal combustion engine, and before the coupling of the internal combustion engine shaft, in particular by means of the first, second clutch, transmission clutch and the transmission input shaft, to the transmission output shaft.

It is preferably the case that, after the closing of the first clutch in the above-discussed step d) et seq., the internal combustion engine is started by means of the centrifugal mass drive unit. The centrifugal mass drive unit forms an energy store and is in particular designed such that the internal combustion engine can be started by means of the rotating centrifugal mass of the centrifugal mass drive unit. During traction operation of the hybrid vehicle, the centrifugal mass of the centrifugal mass drive unit is kept, preferably constantly, above a minimum rotational speed, in particular the centrifugal mass starting rotational speed, necessary for the starting of the internal combustion engine; it is furthermore preferable if an at least temporary increase of the rotational speed of the centrifugal mass drive unit above said minimum rotational speed is made possible; said increase can preferably be achieved by virtue of the centrifugal mass drive unit being driven by means of the electric machine.

In the context of the invention, said minimum rotational speed is preferably determined in relation to the amount of energy required for the start-up of the internal combustion engine. In particular, said amount of energy corresponds to the energy required for accelerating the internal combustion engine to its starting rotational speed (internal combustion engine starting rotational speed) proceeding from the stopped state. An at least temporary considerable increase of the rotational speed of the centrifugal mass drive unit beyond said minimum rotational speed is preferably provided. In this context, a considerable increase is to be understood preferably to mean an increase of the rotational speed of the centrifugal mass drive unit to 1.5 times the minimum rotational speed or higher, preferably to 2 times the minimum rotational speed or higher, and particularly preferably to 5 times the minimum rotational speed or higher. In particular, by means of an increase of the rotational speed of the centrifugal mass drive unit, it is firstly possible for a more reliable start of the internal combustion engine to be made possible, and secondly, energy from the centrifugal mass drive unit can be used for accelerating the hybrid vehicle.

The transmission output shaft is preferably driveable by means of the electric machine after the closure, preferably the at least partial or preferably complete closure, of the transmission clutch, in particular in step d) or preferably d) et seq., and said transmission output shaft is preferably driven by means of the electric machine at least temporarily in step d) or preferably d) et seq. In this way, it is possible, in particular in accordance with a detected acceleration demand of the driver, to generate a corresponding vehicle reaction, that is to say a vehicle acceleration by means of the internal combustion engine, with little effort, wherein this vehicle acceleration takes place particularly promptly in reaction to the acceleration demand of the driver.

In a preferred embodiment of the method, after a start of the internal combustion engine, the second clutch is closed again in a subsequent method step. In particular by means of the closure of the second clutch, the internal combustion engine that has been started up at this point in time is connected rotationally conjointly to the vehicle transmission, in particular to the transmission input shaft of the vehicle transmission, and can accelerate the hybrid vehicle in a desired manner.

In a preferred embodiment of the method, the transmission clutch is closed before step b) and the electric machine is switched into a generator operating mode. In particular, in this way, the vehicle assumes a particularly energy-saving operating state, which is also referred to as "engine-off coasting with recuperation" (Mode5). In this operating state, the rolling hybrid vehicle with shut-down internal combustion engine (no fired operation, internal combustion engine shaft stationary) is braked only by inevitable friction effects and by the settable resistance of the electric machine that occurs in the generator operating mode.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows a further schematic sketch of a drive system according to the invention for a hybrid vehicle.

DETAILED DESCRIPTION OF THE DRAWINGS

Figure 1:
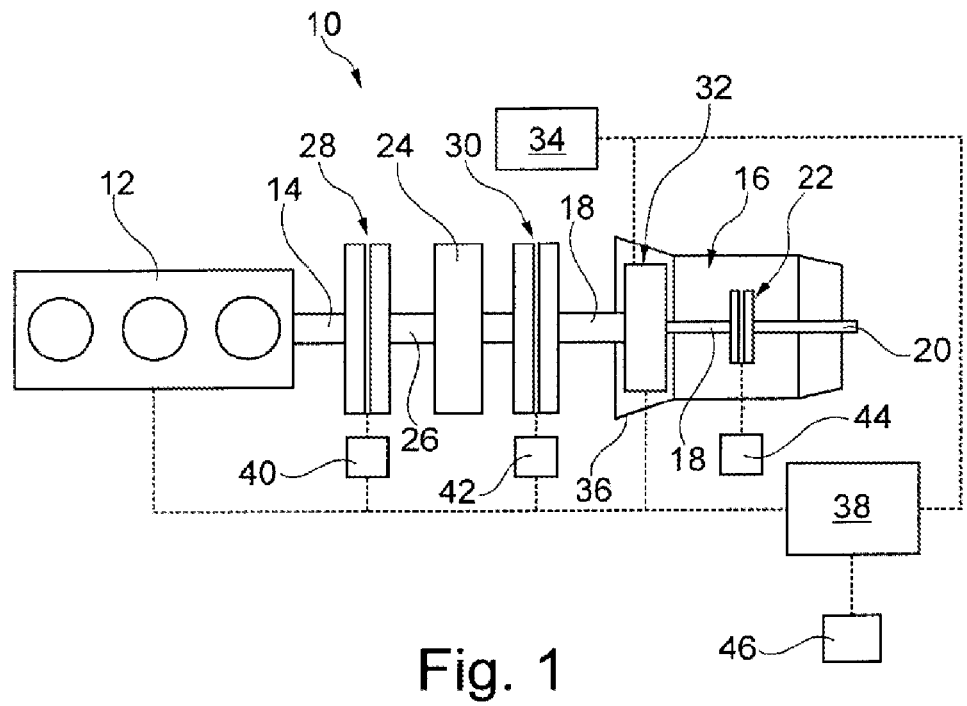
FIG. 1 shows a diagrammatic sketch of a drive system according to the invention for a hybrid vehicle.

FIG. 1 shows a drive system 10 for a hybrid vehicle, having an internal combustion engine 12 which has and can drive an internal combustion engine shaft 14, having an automatic transmission 16, which at the drive side has a transmission input shaft 18 arranged coaxially with respect to the internal combustion engine shaft 14 and at the output side has a transmission output shaft 20 arranged coaxially with respect to the internal combustion engine shaft 14, and a transmission clutch 22 for the coupling or decoupling of the transmission input shaft 18 and of the transmission output shaft 20. The drive system 10 furthermore comprises a centrifugal mass drive unit 24, which is arranged axially between the internal combustion engine 12 and the automatic transmission 16 and which is seated on an intermediate shaft 26 arranged coaxially with respect to the internal combustion engine shaft 14, a first clutch 28 for the coupling or decoupling of the internal combustion engine shaft 14 and the intermediate shaft 26, a second clutch 30 for the coupling or decoupling of the intermediate shaft 26 and the transmission input shaft 18, and an electric machine 32, which is seated on the transmission input shaft 18 and which can drive the latter in a motor operating mode of the electric machine 32.

In FIG. 1, the centrifugal mass drive unit 24 is designed by way of example as a dual-mass flywheel, wherein the flywheel forms an energy store. Regardless of the physical construction of the centrifugal mass drive unit 24, the centrifugal mass thereof permits, together with the first clutch 28, a mechanical impulse start of the shut-down internal combustion engine 12 when the vehicle is at a standstill or rolling. Consequently, an electric starting device for the internal combustion engine 12 can be omitted.

As per FIG. 1, an on-board electrical system 34 is also provided, wherein the electric machine 32 is also formed as a generator and, in a generator operating mode, feeds electrical energy into the on-board electrical system 34.

In the present exemplary embodiment, only a low-voltage on-board electrical system 34 with an operating voltage of less than 60 V is provided. Accordingly, the electric machine 32 is also a low-voltage electric machine, in particular a 48 V electric machine. By virtue of the low-voltage on-board electrical system 34 being formed with a low-voltage electric machine 32, the costs of the drive system 10 can be reduced because, owing to the relatively low electrical voltage in the system, the hazard risk is lower, and the fuse protection of the on-board electrical system 34 can thus be provided more easily and at lower cost.

The use of a 48 V electric machine 32 offers the advantage of an increased power capacity in relation to conventional 12 V electric machines. This is noticeable in particular if the electric machine 32 is, in its motor mode, used for accelerating the hybrid vehicle, but also during the recuperation, when the electric machine 32, in its generator operating mode, generates electrical energy and feeds this into the on-board electrical system 34.

As per FIG. 1, the electric machine 32 is integrated into the automatic transmission 16 of the drive system 10. In particular, it is indicated that the automatic transmission 16 has, at the drive side, a clutch bell housing 36, wherein the electric machine 32 is accommodated in the clutch bell housing 36 and, there, replaces a torque converter that is conventionally provided.

As per FIG. 1, there is also provided an electrical control unit 38 for controlling the internal combustion engine 12, the electric machine 32 and the hybrid vehicle transmission in the form of an automatic transmission 16. The electrical control unit 38 is furthermore connected to an actuator 40 for actuating the first clutch 28, to an actuator 42 for actuating the second clutch 30, and to an actuator 44 for actuating the transmission clutch 22. Also indicated in FIG. 1 is an accelerator pedal 46, by means of the actuation of which the driver of the hybrid vehicle indicates an active acceleration demand, wherein the electrical control unit 38 can detect an actuation of the accelerator pedal 46.

The electrical control unit 38 is connected both to the electric machine 32 and to the on-board electrical system 34, and can switch the electric machine 32 for example from the motor operating mode into the generator operating mode, or vice versa.

Method variants for the operation of the above-described drive system 10 for a hybrid vehicle will be discussed below on the basis of FIGS. 2 and 3.

Figure 2:
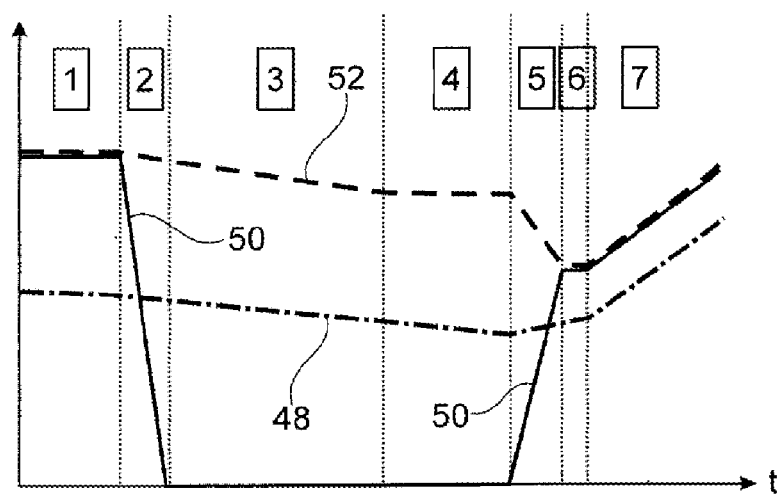
FIG. 2 shows a diagram in which the vehicle speed and the rotational speed of the internal combustion engine and of the centrifugal mass drive unit are plotted versus the time.
Figure 3:
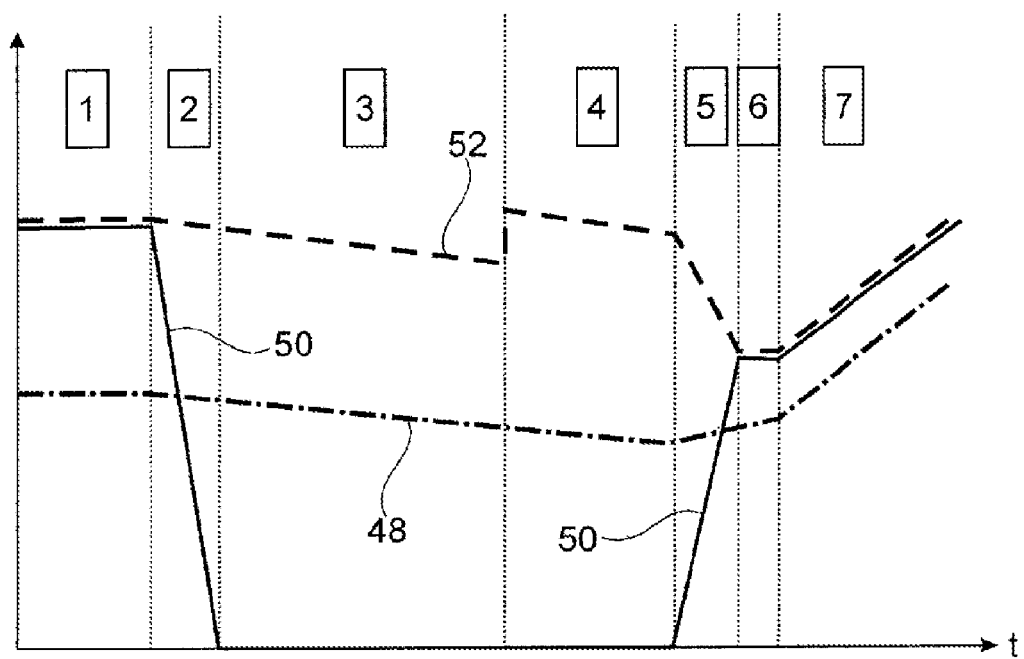
FIG. 3 shows a further diagram in which the vehicle speed and the rotational speeds of the internal combustion engine and of the centrifugal mass drive unit are plotted versus the time.

FIGS. 2 and 3 each show a diagram in which a vehicle speed 48, a rotational speed 50 of the internal combustion engine 12 and a rotational speed 52 of the centrifugal mass drive unit 24 are plotted versus the time t, wherein the diagrams are each divided into time intervals 1 to 7.

In FIG. 2, in the time interval 1, an operating state of the drive system 10 is illustrated in which the hybrid vehicle is being driven by the internal combustion engine 12 and, accordingly, both the transmission clutch 22 and the first clutch 28 and also the second clutch 30 are closed. In the design variant illustrated, in the time interval 1, only friction effects are being compensated by the drive of the internal combustion engine 12, such that the vehicle speed 48 remains substantially constant. Correspondingly, in this time interval 1, the rotational speeds 50, 52 of the internal combustion engine 12 and of the centrifugal mass drive unit 24 likewise have a constant profile, and are in particular identical owing to the closed first clutch 28.

As soon as the electrical control unit 38 identifies that the prerequisites for a change to an energy-saving operating mode are present, in a first method step a), the first clutch 28 is opened and the internal combustion engine 12 is shut down. For this operating state, also referred to as "engine-off coasting", the accelerator pedal 46 must not be actuated. Furthermore, the vehicle speed 48 preferably lies above a predefined speed threshold value, which is ideally selected such that the resulting rotational speed of the centrifugal mass drive unit 24, or the energy stored in the centrifugal mass drive unit 24, is sufficient to start the internal combustion engine 12.

Aside from the abovementioned prerequisites, the electrical control unit 38 may also receive further signals which prevent a switchover to the operating state of "engine-off coasting". Such signals may for example be generated as a result of an excessively low coolant temperature in the engine cooling circuit, a low battery state of charge, an excessively steep longitudinal gradient of the roadway, or an activated item of optional equipment, such as driving in a sport mode.

However, if all prerequisites for the energy-saving operating mode are satisfied, the internal combustion engine 12 is shut down, that is to say is deactivated, and is separated from the drivetrain by virtue of the first clutch 28 being opened. The rotational speed 50 of the internal combustion engine 12 correspondingly falls rapidly to zero in the time interval 2.

In the time interval 3, the transmission clutch 22 and the second clutch 30 are in the closed state, such that the hybrid vehicle rolls substantially freely and is braked only by friction losses.

In order that the rotational speed 52 of the centrifugal mass drive unit 24 does not fall below a predefined minimum rotational speed, the centrifugal mass drive unit 24 can, in the time interval 4, be driven by the electric machine 32. For this purpose, the transmission clutch 22 is opened, and the electric machine 32 is switched into the motor operating mode. Here, the hybrid vehicle continues to roll substantially freely, wherein, as before, friction losses lead to a decrease of the vehicle speed 48.

By contrast, the electric machine 32 actively drives the centrifugal mass of the centrifugal mass drive unit 24, and ensures at least that the energy in the centrifugal mass drive unit 24 is maintained. In other words, the electric machine 32 keeps the centrifugal mass of the centrifugal mass drive unit 24 above the minimum rotational speed sufficient for a mechanical impulse start of the shut-down internal combustion engine 12.

At the end of the time interval 4, a signal for active vehicle acceleration is transmitted to the electrical control unit 38 in a method step b), for example by virtue of the driver actuating the accelerator pedal 46.

The second clutch 30 is thereupon opened by the electrical control unit 38 in a method step c), such that the electric machine 32 and the centrifugal mass drive unit 24 are decoupled.

Subsequently, in a method step d), the first clutch 28 is closed. At the same time, the transmission clutch 22 is also closed (or is kept closed), such that the electric machine 32 is connected rotationally conjointly to the transmission output shaft 20.

As a result of the closure of the first clutch 28, the rotational speed 50 of the internal combustion engine 12 and the rotational speed 52 of the centrifugal mass drive unit 24 equalize rapidly in the time interval 5, wherein the internal combustion engine 12 is started by the centrifugal mass drive unit 24 by means of a mechanical impulse start.

Furthermore, after the closure of the transmission clutch 22 in method step d), the transmission output shaft 20 is driven by the electric machine 32. Consequently, in the time interval 5, a vehicle acceleration generated by the electric machine 32 occurs immediately after the actuation of the accelerator pedal 46 by the driver. This is clear on the basis of the vehicle speed 48 already increasing in the time interval 5 in FIG. 2.

After the start of the internal combustion engine 12 in method step d), the second clutch 30 is closed again (time interval 6) in a subsequent method step e), wherein the electric machine 32 continues to serve for accelerating the vehicle.

At the start of the time interval 7, the started and fired internal combustion engine 12 is connected rotationally conjointly to the transmission output shaft 20 by means of the closed first clutch 28, the closed second clutch 30 and the closed transmission clutch 22, and can accelerate the hybrid vehicle in the desired manner. In this way, in the time interval 7, both the vehicle speed 48 and the rotational speeds 50, 52 of the internal combustion engine 12 and of the centrifugal mass drive unit 24 increase.

Owing to the limited power of the electric machine 32, the vehicle acceleration in the time intervals 5 and 6 is less intense than the vehicle acceleration provided by the internal combustion engine 12 in the time interval 7. Nevertheless, the driver, already in the time intervals 5 and 6, that is to say directly after his or her actuation of the accelerator pedal 46, receives the desired vehicle feedback in the form of a noticeable vehicle acceleration. The drive system 10 thus reacts in a less inert manner, and provides the driver with better driving feel.

FIG. 3 illustrates, analogously to FIG. 2, a method variant for the operation of the above-described drive system 10 for a hybrid vehicle.

The method variant illustrated in FIG. 3 differs from the method variant as per FIG. 2 merely in that, before the signal for active vehicle acceleration in method step b), the transmission clutch 22 is closed (or is kept closed) and the electric machine 32 is switched into a generator operating mode. In other words, in the time intervals 3 and 4, recuperation is performed, that is to say a conversion of the kinetic vehicle energy into electrical energy by means of the electric machine 32 in the generator operating mode.

The resistance of the electric machine 32 in the generator operating mode results in a more intense vehicle deceleration, such that the vehicle speed 48 in the time intervals 3 and 4 as per FIG. 3 decreases more intensely than the vehicle speed 48 in the time intervals 3 and 4 as per FIG. 2.

Since the electric machine 32 is in the generator operating mode in the time interval 4 as per FIG. 3, it cannot drive the centrifugal mass drive unit 24.

The decrease of the rotational speed 52 of the centrifugal mass drive unit 24 to below the predefined minimum rotational speed is prevented in this case by means of a transmission shift strategy of the automatic transmission 16. If the minimum rotational speed of the centrifugal mass drive unit 24 is reached, then, by downshifting of the automatic transmission 16 into a lower gear ratio, the rotational speed of the transmission input shaft 18, and by means of the closed second clutch 30 also the rotational speed 52 of the intermediate shaft 26 and thus the rotational speed of the centrifugal mass drive unit 24, are abruptly increased (see FIG. 3, in the transition region of the time intervals 3 and 4). It is thereby ensured that the rotational speed 52 or the energy stored in the centrifugal mass drive unit 24 is sufficient to perform a mechanical impulse start of the internal combustion engine 12.

Figure 4:
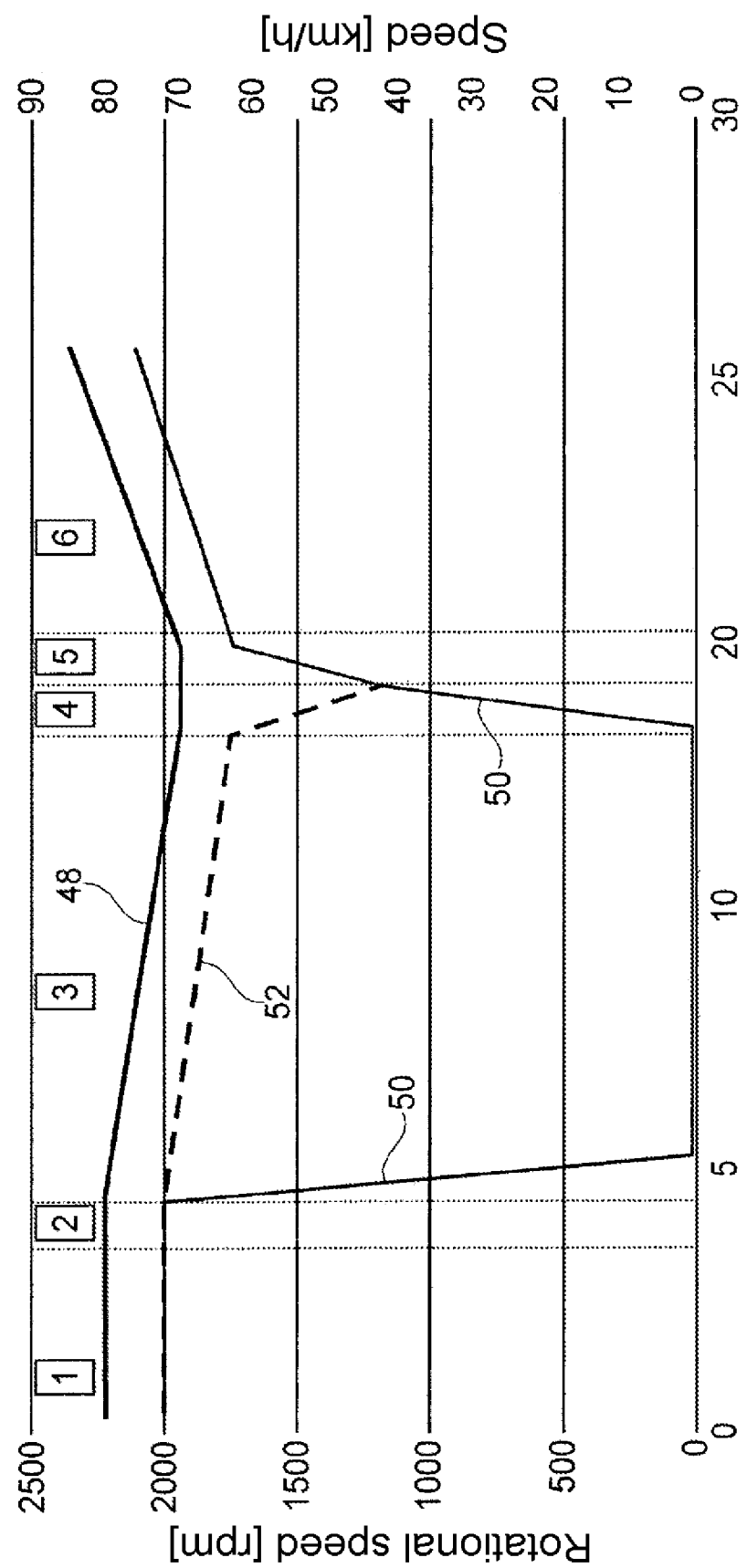
FIG. 4 shows a further diagram in which the vehicle speed and the rotational speeds of the internal combustion engine and of the centrifugal mass drive unit are plotted versus the time.

Below, the method for engine-off coasting (internal combustion engine is shut down, internal combustion engine shaft 14 is static, vehicle is in motion, vehicle brake device is not activated) will be described demonstratively on the basis of FIG. 4. The numerals 1 to 6 shown in rectangles denote individual time phases 1 to 6. During travel (vehicle speed 48 constant, phase 1), the rotational speed of the centrifugal mass drive unit 52 and the rotational speed of the internal combustion engine shaft 50 are synchronous, that is to say they rotate at the same rotational speed, because the first clutch is closed.

For the engine-off coasting, the hybrid vehicle is in a coasting state; for this purpose, in particular, the foot is removed from the accelerator pedal and the speed 48 of the vehicle lies above a predefinable speed threshold; said speed threshold is preferably 30 km/h or higher, preferably 50 km/h or higher, and particularly preferably 80 km/h or higher.

In phase 2, the internal combustion engine is shut down, that is to say is deactivated; for this purpose, the first clutch is opened and the internal combustion engine is thus completely separated from the rotary vibration reduction device. The rotational speed of the internal combustion engine 50 falls to zero within a few rotations, because the centrifugal mass of the internal combustion engine is low. The internal combustion engine is thus separated from the drivetrain, and in particular does not cause any drag losses during overrun operation.

In phase 3, the vehicle is rolling freely; in particular, no drag torque of the internal combustion engine is acting on the driveable wheels. As discussed, the first clutch is open, but the second clutch remains closed, such that the centrifugal mass drive unit and thus the rotary vibration reduction device co-rotate at the rotational speed of the transmission input shaft. By means of the control method according to the invention, the rotational speed of the centrifugal mass drive unit is kept above a definable minimum value; said minimum value is predefinable in a manner dependent on the boundary conditions. Here, the minimum value is coordinated in particular with the energy required for starting the internal combustion engine; the minimum value may preferably be determined mathematically in a simulation or by testing and may be selected such that, by means of the centrifugal mass drive unit, power can be provided for starting the internal combustion engine and at the same time for accelerating the hybrid vehicle.

During motion on level ground, as is assumed here, the speed of the hybrid vehicle continues to decrease slightly (rolling and air resistance, recuperation torque of the electric machine etc. reduce the speed of the vehicle); this speed reduction is visualized by the falling profile of the vehicle speed 48 in phase 3. A departure from the engine-off coasting state, such that a demand for starting of the internal combustion engine is thus present, may arise in particular as a result of actuation of the brake pedal, of the accelerator pedal, in the event of a speed threshold being reached/undershot, or in the event of a demand from the on-board electrical system of the hybrid vehicle, in particular in the event of a minimum state of charge of a battery being undershot. Owing to the demand for starting, the internal combustion engine is started by virtue of the method as per Mode4 being implemented (phase 4 and 5).

During starting, the rotational speed 52 of the centrifugal mass drive unit initially decreases (phase 4) because power for accelerating the internal combustion engine shaft, the rotational speed 50 of which increases, is transmitted to the internal combustion engine shaft from the centrifugal mass drive unit via the closed first clutch. The electric machine outputs power for accelerating the hybrid vehicle to the transmission input shaft.

After the starting rotational speed of the internal combustion engine is reached, the latter is set in fired operation, and outputs power to the centrifugal mass drive unit, and as a result the rotational speed 50, 52 of the internal combustion engine shaft and of the centrifugal mass drive unit increases (phase 5).

As soon as the rotational speed 50 of the internal combustion engine shaft has reached the correct level and all of the first clutch, the second clutch and the transmission clutch are closed, the hybrid vehicle is accelerated by output of power from the internal combustion engine (phase 6).

It is additionally possible in the engine-off coasting operating state for the energy recovery (recuperation) to also be implemented. As discussed above, the hybrid vehicle is, for this purpose, in the coasting state, corresponding to phase 3.

The internal combustion engine is separated from the drivetrain (centrifugal mass drive unit, vehicle transmission) by means of the open first clutch. The internal combustion engine is shut down. By contrast to the above-described situation without recuperation, the speed of the vehicle is braked more intensely, owing to a recuperation torque that is imparted to the transmission input shaft counter to the direction of rotation thereof by the electric machine (negative torque), than in the previous situation; this would be reflected in the diagram of FIG. 4 by a more intense decrease of the vehicle speed 48 and of the rotational speed 52 of the centrifugal mass drive unit.

The kinetic energy of the hybrid vehicle and of the centrifugal mass drive unit are, during the recuperation in the electric machine in the generator operating mode, converted into electrical energy, and are fed into the vehicle on-board electrical system.

A demand for departure from the recuperation, that is to say from the operating mode (Mode5) with recuperation, is realized for example by actuation of the accelerator pedal or when a speed threshold is reached. The sequence of the departure is analogous to the above-discussed method without recuperation (Mode5) in phases 4 and 5, FIG. 4.

Figure 5:
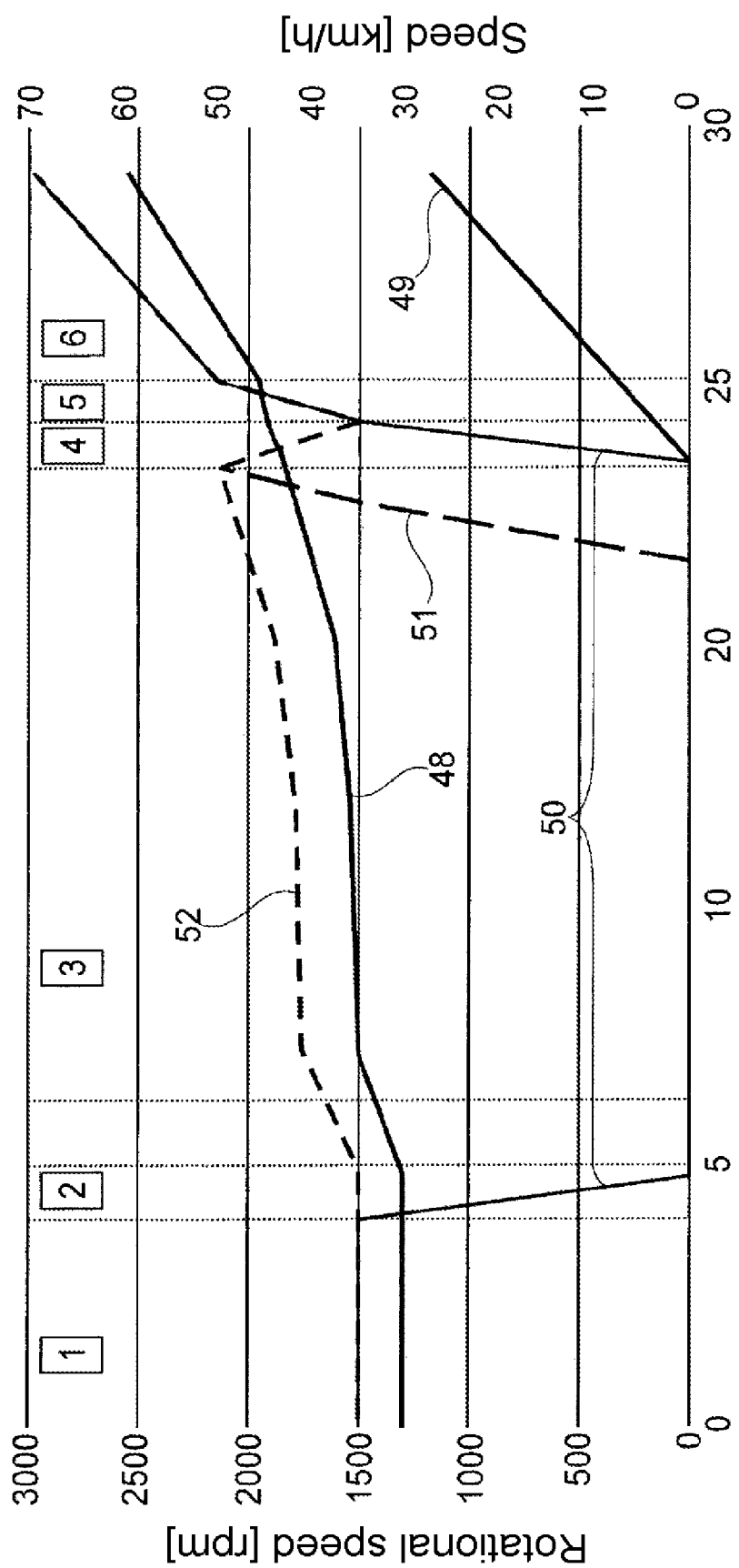
FIG. 5 shows a further diagram in which the vehicle speed and the rotational speeds of the internal combustion engine and of the centrifugal mass drive unit are plotted versus the time.

FIG. 5 shows driving situations in which the hybrid vehicle is at least temporarily driven by the electric machine alone (electric driving), whereas the internal combustion engine is shut down (zero emissions). Here, the internal combustion engine is started by means of a method as per Mode4, and, for the driving of the hybrid vehicle by means of the electric machine, the drive system is operated, in accordance with a method according to Mode5, in the variant of engine-off electric driving.

By contrast to one of the operating states discussed above, in which the internal combustion engine is shut down and the electric machine is utilized for energy recovery or passively co-rotates with the transmission input shaft (coasting), it is the case in the present operating state that the electric machine is operated in the motor operating mode, that is to say provides a drive torque in the direction of rotation of the transmission input shaft. In phase 1, the hybrid vehicle is moving at a constant vehicle speed 48, driven by the internal combustion engine. In phase 2, the internal combustion engine is shut down, the rotational speed 50 falls to zero, the first clutch is in an open state, and the rotational speed 52 of the centrifugal mass drive unit remains constant.

In phase 3, the electric machine accelerates the vehicle, and the rotational speed 52 of the centrifugal mass drive unit and the vehicle speed 48 increase.

In phases 2 and 3, the first clutch is in an open state and the second clutch is in a closed state, such that it is made possible for the internal combustion engine shaft, which is stationary in phase 3, to be decoupled from the centrifugal mass drive unit, but the centrifugal mass drive unit is connected rotationally conjointly to the transmission input shaft, and the electric machine provides the torque, required for driving the hybrid vehicle, to the transmission input shaft, so-called electric driving.

Here, electric driving is possible in accordance with the power capacity of the electric machine. Tests have shown that, in the context of the proposed low-voltage electric machine with a rated voltage of 48 V, traction demands of up to 15-20 kW can be covered; this corresponds, in the case of a hybrid vehicle with a vehicle weight of approximately 1.5 t, to vehicle speeds up to approximately 60 km/h and an acceleration of approximately 1.5 m/s$^2$.

If the acceleration demand in this speed range up to approximately 60 km/h, in particular in accordance with the accelerator-pedal-based driver demand, exceeds the acceleration capability of the electric machine, then by means of a centrifugal-mass-based start the internal combustion engine is started very rapidly and comfortably by means of a method as per Mode4, and these relatively high acceleration demands can be realized by means of the internal combustion engine; here, the start of the internal combustion engine is illustrated in phases 4 and 5. During the starting of the internal combustion engine, the rotational speed 52 of the centrifugal mass drive unit initially falls, and at the same time, the rotational speed 50 of the internal combustion engine shaft increases. After the starting rotational speed is reached, the internal combustion engine is set in fired operation, and then accelerates the centrifugal mass drive unit (phase 5). In phase 6, the internal combustion engine is significantly used for accelerating the hybrid vehicle; for this purpose, the first and second clutches and transmission clutch are closed.

Electric driving with a shut-down internal combustion engine is, with the proposed drive system, made possible even from the vehicle standstill state. Here, phases 1 and 2 from FIG. 5 are omitted. Phase 3 from FIG. 5 then corresponds to variably implementable electric driving phases, or in a further case, to the vehicle standstill state. In the case of electric driving from the standstill state of the vehicle, and thus from the stopped state of the centrifugal mass drive unit, the electric machine initially provides the power for driving the hybrid vehicle, and the centrifugal mass drive unit is additionally accelerated. During the start-up of the internal combustion engine (phases 4 and 5) by means of a method as per Mode4, the electric machine, as discussed, continues to provide the driver demand where possible in terms of power and torque, and in phase 6, the internal combustion engine is used for accelerating the vehicle.

Upon an initial start of the internal combustion engine, a rotational speed profile 51 for the centrifugal mass drive unit is obtained; the rotational speed 52 of the centrifugal mass drive unit in phases 4 and 5 remains unchanged. The vehicle speed 49 for the initial start shows that the hybrid vehicle already accelerates as the internal combustion engine is starting up. The profile of the rotational speed 51 for the centrifugal mass drive unit arises from the prediction of the starting process. The rotational speed 51 of the centrifugal mass drive unit is increased as soon as a person has sat down on the driver's seat. At the start of the phase 4, the start button is actuated, and the centrifugal mass drive unit is coupled to the internal combustion engine shaft by means of the first clutch. The hybrid vehicle can however already accelerate during this starting process because, by means of the electric machine and the centrifugal mass drive unit, drive power can be transmitted via the second clutch and the transmission clutch to the driveable wheels.

FIG. 6 shows a drive system 10 for a hybrid vehicle, having an internal combustion engine 12 which has and can drive an internal combustion engine shaft 14, having a vehicle transmission 16, which at the drive side has a transmission input shaft 18 arranged coaxially with respect to the internal combustion engine shaft 14 and at the output side has a transmission output shaft 20 arranged coaxially with respect to the internal combustion engine shaft 14, and having a transmission clutch 22 for the coupling or decoupling of the transmission input shaft 18 and of the transmission output shaft 20.

Here, as in FIG. 1, the vehicle transmission is illustrated in highly simplified form. The vehicle transmission 16 has a multiplicity of shiftable gear ratios, by means of which the transmission ratio between the transmission input shaft and the transmission output shaft can be varied.

The drive system 10 furthermore comprises a centrifugal mass drive unit 24, which is arranged axially between the internal combustion engine 12 and the vehicle transmission 16 and which is seated on an intermediate shaft 26 arranged coaxially with respect to the internal combustion engine shaft 14, and a first clutch 28 for the coupling or decoupling of the internal combustion engine shaft 14 and the intermediate shaft 26. The first clutch 28 has a drive-side input side 60 and a driven-side output side 60. Furthermore, the drive system 10 has a second clutch 30 for the coupling or decoupling of the intermediate shaft 26 and the transmission input shaft 18. The second clutch 30 has a drive-side input side 64 and a driven-side output side 66. Furthermore, the drive system 10 has an electric machine 32 which is arranged on the transmission input shaft 18 and which, in a motor operating mode, can drive said transmission input shaft or, in a generator operating mode, can brake said transmission input shaft.

The centrifugal mass drive unit 24 has a dual-mass flywheel 54 with a DU input shaft 56 and a DU output shaft 58. The dual-mass flywheel 54 forms an energy store. Regardless of the specific construction of the centrifugal mass drive unit 24, the centrifugal mass thereof, together with the first clutch 28, permits a mechanical impulse start of the shut-down internal combustion engine 12 when the vehicle is at a standstill or rolling. Consequently, an electric starting device for the internal combustion engine 12 can be omitted. The dual-mass flywheel 54 is arranged entirely between the first and the second clutch 28, 30; the DU input side is coupled rotationally conjointly to the driven-side output side 62 of the first clutch 28, and the DU output side is permanently coupled rotationally conjointly to the intermediate shaft 26, which is permanently coupled rotationally conjointly to the drive-side input side 64 of the second clutch.

With regard in particular to a control unit and on-board electrical system, not illustrated in FIG. 6, reference is made to FIG. 1. The drive power is transmitted via the vehicle transmission 16 to the single driveable wheel 68 that is illustrated; here, the basic construction of the drive system is transferable to front-wheel drive, rear-wheel drive and all-wheel drive for vehicles.

As per FIG. 6, the electric machine 32 is integrated into the vehicle transmission 16 of the drive system 10. It is indicated in particular that the vehicle transmission 16 has, at the drive side, a clutch bell housing 36, wherein the electric machine 32 is accommodated in the clutch bell housing 36 and, there, replaces a torque converter that is conventionally provided.

With regard to the control of the drive system 10 illustrated in FIG. 6 by means of actuators, control unit and accelerator pedal (not illustrated here), reference is made to FIG. 1.

The proposed drive system, and the control of said drive system in accordance with the proposed method, yield a multiplicity of advantages, including:

With regard to the conservation of angular momentum during the start of the internal combustion engine, it is the case that no external torque arises (acceleration of the internal combustion engine shaft/braking of the centrifugal mass drive unit), such that this absent external torque does not have to be supported at the engine mounts, and the latter are relieved of load Furthermore, the so-called starting vibration is reduced, in particular by virtue of the internal combustion engine being accelerated to a high starting rotational speed By means of the assignment of the entire rotary vibration reduction device, expedient rotary mass conditions arise (small rotary mass of the internal combustion engine/large rotary mass of the centrifugal mass drive unit), such that short start-up times of the internal combustion engine can be realized. Tests have shown that a start-up time of <100 ms can be achieved for the internal combustion engine After the energy for the starting of the internal combustion engine has been extracted from the centrifugal mass drive unit (purely mechanically) at the time of the start, there is no further burden on the on-board electrical system during the starting of the internal combustion engine, and therefore no on-board electrical system stability measures are required for preventing voltage drops during the start of the internal combustion engine Altogether, the drive system is controllable such that it reacts quickly to a wide variety of driving situations Tests have shown that engine start-stop operation, for example for a stoppage at a traffic signal, can be realized in a particularly comfortable manner, As presented by way of the individual operating modes, it is possible with the drive system to cover a wide variety of driving situations without the need to provide a high-voltage drive machine for this purpose The electric machine can be optimized for traction operation, because the otherwise often dominant cold-start requirements on the electric machine are eliminated because, in particular, the internal combustion engine cold start (high breakaway torque of the internal combustion engine) is replicated by means of the centrifugal mass drive unit; in this way, in particular, in relation to conventional drive systems, a further electrical start-up unit, such as in particular a pinion-type starter, is omitted.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

10 Drive system
12 Internal combustion engine
14 Internal combustion engine shaft
16 Vehicle transmission/automatic transmission
18 Transmission input shaft
20 Transmission output shaft
22 Transmission clutch
24 Centrifugal mass drive unit
26 Intermediate shaft
28 First clutch
30 Second clutch
32 Electric machine
34 Low-voltage on-board electrical system
36 Clutch bell housing
38 Control unit/control device
40 Actuator for operating the first clutch
42 Actuator for operating the second clutch
44 Actuator for operating the transmission clutch
46 Accelerator pedal
48 Vehicle speed
49 Vehicle speed at initial start
50 Rotational speed of the internal combustion engine shaft
51 Rotational speed of the centrifugal mass drive unit at initial start
52 Rotational speed of the centrifugal mass drive unit
54 Rotary vibration reduction device
56 DU input shaft
58 DU output shaft
60 Input side of the first clutch
62 Output side of the first clutch
64 Input side of the second clutch
66 Output side of the second clutch
68 Driveable wheel

What is claimed is:

1. A drive system for a hybrid vehicle, comprising:
an internal combustion engine having an internal combustion engine shaft configured to output drive power in the direction of drivable wheels of the hybrid vehicle;
a vehicle transmission having a transmission input shaft at a drive side, a transmission output shaft at an output side, and a transmission clutch configured to couple or decouple the transmission input shaft and the transmission output shaft;
a centrifugal mass drive unit arranged between the internal combustion engine shaft and the transmission input shaft;
an intermediate shaft;

a first clutch configured to couple or decouple the internal combustion engine shaft to or from the intermediate shaft, the first clutch being arranged between the engine and the centrifugal mass drive unit;

a second clutch configured to couple or decouple the intermediate shaft to or from the transmission input shaft;

an electric machine arranged between an output side of the second clutch and the transmission input shaft, the electric machine being configured to transfer torque to the transmission input to drive the hybrid vehicle in a motor operating mode; and an electric control unit configured to control actuation of the first clutch, second clutch, transmission clutch and electric machine, wherein the centrifugal mass drive unit has a rotary vibration reduction device having a reduction device drive-side input shaft and a reduction device output-side output shaft, the rotary vibration reduction device being configured to reduce rotary vibrations of the intermediate shaft, and the rotary vibration reduction device is arranged entirely between the first clutch and the second clutch.

2. The drive system for a hybrid vehicle as claimed in claim 1, wherein the rotary vibration reduction device includes a primary side facing toward the internal combustion engine and a secondary side facing toward the vehicle transmission.

3. The drive system for a hybrid vehicle as claimed in claim 2, wherein the reduction device input shaft is rotatable relative to the reduction device output shaft such that rotary vibrations are reduced, and the reduction device input shaft and the reduction device output shaft are arranged concentrically with respect to one another and concentrically with respect to the internal combustion engine shaft.

4. The drive system as claimed in claim 3, wherein
the rotary vibration reduction device is a rotational-speed-adaptive absorber.

5. The drive system as claimed in claim 4, wherein
the rotational-speed-adaptive absorber has a centrifugal pendulum configured for rotational speed adaptation.

6. The drive system as claimed in claim 5, wherein
the rotary vibration reduction device is a semi-active or active absorber.

7. The drive system as claimed in claim 1, wherein
the electric machine is a low-voltage electric machine with an operating voltage of less than 60 V.

8. The drive system as claimed in claim 7, wherein
the electric machine is integrated into the vehicle transmission.

9. The drive system as claimed in claim 8, wherein
the vehicle transmission is an automatic transmission or a vehicle transmission with automated shift capability.

10. The drive system as claimed in claim 9, wherein
the vehicle transmission includes a bell housing in which the electric machine is arranged.

11. The drive system as claimed in claim 1, further comprising:

an on-board electrical system wherein the electric machine is operable as a generator and in a generator operating mode feeds electrical energy to the on-board electrical system.

12. A method for operating a drive system for a hybrid vehicle, the drive system including, an internal combustion engine having an internal combustion engine shaft configured to output drive power in the direction of drivable wheels of the hybrid vehicle, a vehicle transmission having a transmission input shaft at a drive side, a transmission output shaft at an output side, and a transmission clutch configured to couple or decouple the transmission input shaft and the transmission output shaft, a centrifugal mass drive unit arranged between the internal combustion engine shaft and the transmission input shaft, an intermediate shaft, a first clutch configured to couple or decouple the internal combustion engine shaft to or from the intermediate shaft a second clutch configured to couple or decouple the intermediate shaft to or from the transmission input shaft, and an electric machine configured to transfer torque to the transmission input to drive the hybrid vehicle in a motor operating mode, the centrifugal mass drive unit having a rotary vibration reduction device having a reduction device drive-side input shaft and a reduction device output-side output shaft, the rotary vibration reduction device being configured to reduce rotary vibrations of the intermediate shaft, the rotary vibration reduction device is arranged entirely between the first clutch and the second clutch, and an electric control unit configured to control actuation of the first clutch, second clutch, transmission clutch and electric machine, comprising the acts of:

determining whether the drive system is in an operating state in which at least one of the first clutch is opened and the internal combustion engine is deactivated;

operating the electric machine with second clutch closed such that the centrifugal mass drive unit is accelerated to or maintained at a centrifugal mass starting rotational speed;

receiving at the electric control unit a signal for active vehicle acceleration;

determining from the signal for active vehicle acceleration a start-up of the internal combustion engine is needed;

opening the second clutch with the electric control unit;

after the second clutch is opened, closing the first clutch with the electric control unit such that angular momentum from the centrifugal mass drive unit rotates the internal combustion engine to an internal combustion engine starting rotational speed; and after reaching the internal combustion engine starting rotational speed, operating the internal combustion engine in a fired operating mode and accelerating the internal combustion engine to an internal combustion engine target rotational speed.

13. The method for operating a drive system as claimed in claim 12, further comprising the act of:

after reaching the internal combustion engine starting rotational speed, closing the second clutch, such that with the transmission clutch closed, a force-transmitting connection from the internal combustion engine shaft is established to drivable wheels of the hybrid vehicle.

14. The method for operating a drive system as claimed in claim 13, wherein during the act of closing the second clutch after the internal combustion engine starting rotational speed is reached, the electric machine is in force-transmitting connection to the drivable wheels of the hybrid vehicle.

15. The method for operating a drive system as claimed in claim 14, further comprising the act of:

when the internal combustion engine is deactivated and the vehicle in a standstill state or traveling at crawling speed, before the act of closing the second clutch when the internal combustion engine starting rotational speed is reached, closing the second clutch and operating the transmission clutch in a partially closed state, such that the electric machine and the centrifugal mass drive unit rotate together at or above the centrifugal mass starting rotational speed, wherein the centrifugal mass starting rotational speed is higher than a rotational speed of the electric machine corresponding to a present vehicle wheel rotational speed that would result if the transmission clutch was completely closed.

16. The method for operating a drive system as claimed in claim 15, wherein the centrifugal mass starting rotational speed is between 1000 rpm and 1400 rpm.

17. The method for operating a drive system as claimed in claim 16, further comprising the act of:

before the act of determining the drive system operating state, and after an initialization of the vehicle, adjusting the centrifugal mass rotational speed to the centrifugal mass starting rotational speed using the electric machine with the second clutch closed.

18. The method for operating a drive system as claimed in claim 17, wherein during the act of adjusting the centrifugal mass rotational speed to the centrifugal mass starting rotational speed, concurrently providing torque from the electric machine to the drivable wheels of the hybrid vehicle.

\* \* \* \* \*